Feb. 26, 1963   G. R. ARSENEAULT   3,078,787
COMBINATION SKEWER AND FORK
Filed May 6, 1960
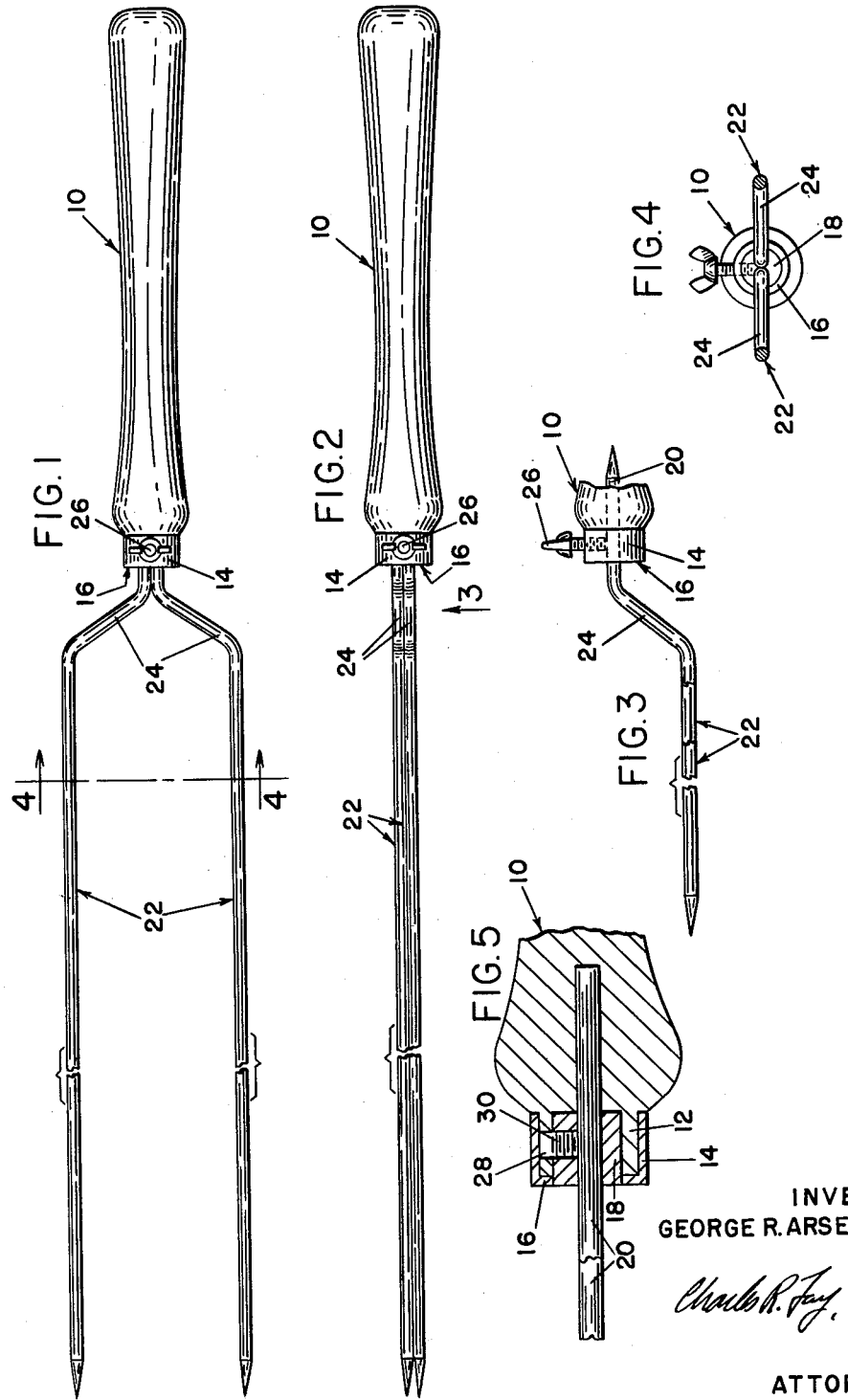
INVENTOR
GEORGE R. ARSENEAULT
ATTORNEY

United States Patent Office 3,078,787
Patented Feb. 26, 1963

3,078,787
COMBINATION SKEWER AND FORK
George R. Arseneault, 226 Main St., Webster, Mass.
Filed May 6, 1960, Ser. No. 27,319
3 Claims. (Cl. 99—419)

This invention relates to a new and improved combined skewer and fork particularly adapted for cooking purposes, especially outdoors, and the principal object of the invention resides in the provision of a device of the class described which comprises a handle and a pair of elongated sharpened members which are rotatably adjustably mounted in said handle and including means to hold the same in adjusted position, said elongated members having offset portions so that they may be either selectively moved to a position wherein they lie in contact to form in effect a single but extra strong skewer; or they may be partially rotated in opposite directions, to form an elongated fork, the tines being separated and capable of utilization for cooking foods such as steaks and frankfurters, among other things, so that the two tines of the fork may be utilized to pierce the food to be cooked, preventing the same from rotating on the skewer as would be the case with a single skewer.

The invention further relates to arrangements and combinations of parts which will be hereinafter described and more particularly set forth in the appended claims.

Reference is to be had to the accompanying drawings, in which

FIG. 1 is a plan view illustrating the invention, with the tines separated;

FIG. 2 is an edge view showing the tines together forming a single double tine;

FIG. 3 is a partial view illustrating the tines looking in the direction of arrow 3 in FIG. 2;

FIG. 4 is a section on line 4—4 of FIG. 1; and

FIG. 5 is an enlarged sectional view illustrating the details whereby the tines are held to the handle.

In carrying out the invention, there is provided a handle generally indicated at 10. This handle may be of any desired size or construction but it is preferably made rather elongated for ease in manipulation thereof in front of a fire. This handle is provided with a reduced forward portion which is seen at 12 in FIG. 5 and on this forward portion there is mounted a ferrule or the like 14. The ferrule has a forward circular portion at 16 which is centrally apertured and a plug or the like 18 is mounted therewithin.

The plug 18 is provided with a pair of through holes for the reception of the butt ends 20, 20 of a pair of similar sharpened skewer members or the like generally indicated at 22, 22. The butt ends 20 are rotatably held in the insert 18 and the elongated skewer members have offset portions at 24.

The butt members 20 extend inwardly into the handle itself as seen best in FIG. 5, and they are arranged in close side-by-side relation in the insert 18. A holding screw or the like 26 extends through a radial opening 28 in the reduced forward portion of the handle 12 and thence into a threaded bore 30 in the insert. The screw therefore impinges on both of the butt ends 20 as perhaps best seen in FIG. 4 and clamps them both together in fixed position simultaneously.

It will be seen that the two elongated skewer members 22, 22 may be set closely together in contiguous relationship as shown in FIGS. 2 and 3, and in this case a single strong, sturdy, elongated skewer member is provided upon which shish-ka-bob or other comestibles may be mounted in order to cook the same. By being double, this skewer is a great deal stronger and also the food is much less liable to rotate on it because of the side-by-side relationship of the members 22, 22.

On the other hand, the screw 26 may be loosened and the elongated members may be rotated to any degree desired from a contacting position as in FIG. 2 to a widespread condition as in FIGS. 1 and 4, and in this relationship of the parts it will be seen that an elongated fork is provided. Both tines of this fork may be utilized to be applied to a single piece of food to be cooked such as a piece of steak or a frankfurter or the like, and in this case of course the fork may be laid upon the grill without any danger of the food to be cooked turning on the skewer as is usually the case where a single skewer is utilized. A dozen to a dozen-and-a-half frankfurters can be cooked at once.

Also, the skewers may be adjusted to an adjacent but somewhat spaced relation, and in this event even shish-ka-bob or marshmallows can be held and cooked without turning, slipping, or sagging, thus avoiding undercooked tops and over-cooked bottoms, as well as obtaining these beneficial results with steaks and frankfurters.

If desired, the skewers may be removed completely from their bores in the insert 18 and in the handle 10 and reversed, so that the pointed ends are safely housed in the handle; or, if desired, the interior ends of the butt ends 20 may be pointed as shown in FIG. 3, and in this case of course these ends may be used also as a fork having offset ends adjacent the outer terminal portions thereof.

Having thus described my invention and the advantages thereof, I do not wish to be limited to the details herein disclosed, otherwise than as set forth in the claims, but what is claimed is:

1. A combined skewer and fork comprising an elongated handle, means forming a pair of side-by-side generally parallel axially arranged bores in said handle at one end thereof, said bores being closely adjacent each other, a pair of skewers each having an end located in a separate bore, said ends being plain and straight, each said skewer having an elongated offset sharpened portion external with relation to the respective bores, said skewers being rotatable in the bores about said ends as axes to locate the offset sharpened portions of the skewers in close proximity to each other so that they are located in closely adjacent position to form, essentially, an elongated single sharp skewer, and being selectively rotatable so that the offset portions of the skewers are relatively widely separated to form a two tined fork, and a single removable means for securing the skewers in position in the handle, said single means impinging upon both plain, straight ends of the skewers at once.

2. The skewer and fork of claim 1 wherein the means for securing the tines comprises a screw-threaded member which extends radially through the insert and impinges upon both of the skewers at the same time.

3. The skewer and fork of claim 1 wherein the offsets are adjacent the ends of the skewers in the bores, and the skewers are removable from the bores and reversible, so that the sharpened ends are in the bores and thus protectively associated with the handle.

References Cited in the file of this patent

UNITED STATES PATENTS

| | | |
|---|---|---|
| 985,934 | Probst | Mar. 7, 1911 |
| 1,238,015 | Henderson | Aug. 21, 1917 |
| 1,769,471 | Smith | July 1, 1930 |
| 2,663,543 | Moseley | Dec. 12, 1953 |
| 2,974,993 | Duniven | Mar. 14, 1961 |